United States Patent [19]

Cambonie

[11] Patent Number: 4,873,658
[45] Date of Patent: Oct. 10, 1989

[54] INTEGRATED DIGITAL SIGNAL PROCESSING CIRCUIT FOR PERFORMING COSINE TRANSFORMATION

[75] Inventor: Joël Cambonie, Fontaine, France
[73] Assignee: SGS-Thomson Microelectronics S.A., Paris, France
[21] Appl. No.: 135,266
[22] Filed: Dec. 21, 1987

[30] Foreign Application Priority Data

Dec. 22, 1986 [FR] France .................. 86 17936

[51] Int. Cl.[4] ......................... G06F 15/332
[52] U.S. Cl. ................................ 364/725
[58] Field of Search ............... 364/725, 726

[56] References Cited

U.S. PATENT DOCUMENTS

| | | | |
|---|---|---|---|
| 3,588,460 | 6/1971 | Smith | 364/726 |
| 3,673,399 | 6/1972 | Hancke et al. | 364/726 |
| 3,702,393 | 11/1972 | Fuss | 364/726 |
| 3,721,812 | 3/1973 | Schmidt | 364/726 |
| 3,731,284 | 5/1973 | Thies | 364/726 |
| 3,892,956 | 7/1975 | Fuss | 364/726 |
| 4,298,950 | 11/1981 | Smith, Jr. | 364/726 |
| 4,385,363 | 5/1983 | Widergren | 364/725 |
| 4,601,006 | 7/1986 | Liu | 364/726 |
| 4,748,579 | 5/1988 | Zibman et al. | 364/726 |

FOREIGN PATENT DOCUMENTS 0141752 5/1985 European Pat. Off. .

OTHER PUBLICATIONS

Proceedings IEEE ICASSP, 1984, pp. 238A.2.1-2-8A.3.4, New York, US; B. G. Lee "FCT-a fast cosine transform".

Primary Examiner—Gary V. Harkcom
Assistant Examiner—Dale M. Shaw
Attorney, Agent, or Firm—Oblon, Spivak, McClelland, Maier & Neustadt

[57] ABSTRACT

Integrated circuits capable of carrying out transformations of the "cosine transformation" type, used more particularly for the digital processing of images with a view to information compression. The versatile and compact circuit architecture involves dividing a bus into sections separated by switches actuated in phase opposition; certain sections are coupled to computing operators, whereas others are coupled to memories serving for reorganizing the order in which the data is presented to the following operators.

2 Claims, 7 Drawing Sheets

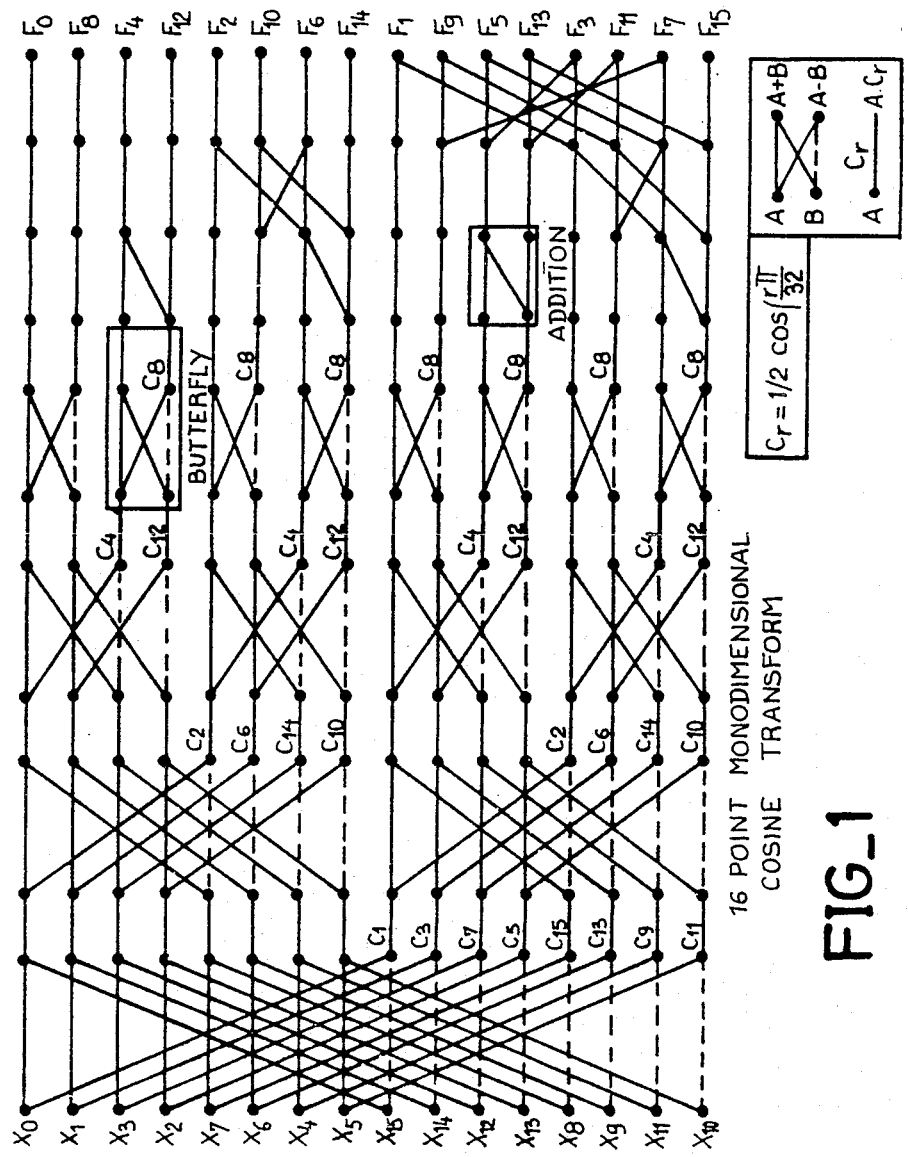
FIG_1

FIG_2
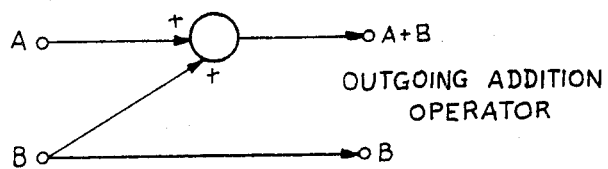
OUTGOING ADDITION OPERATOR
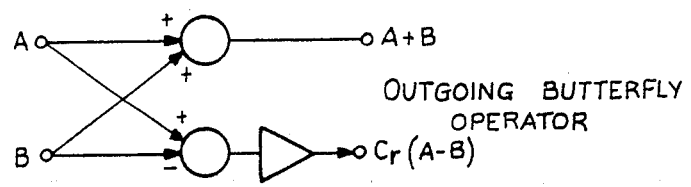
OUTGOING BUTTERFLY OPERATOR
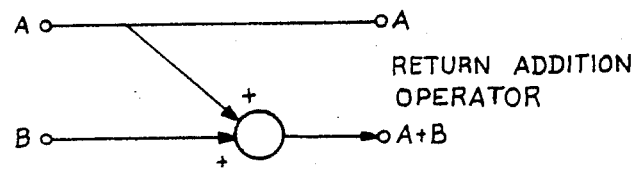
RETURN ADDITION OPERATOR
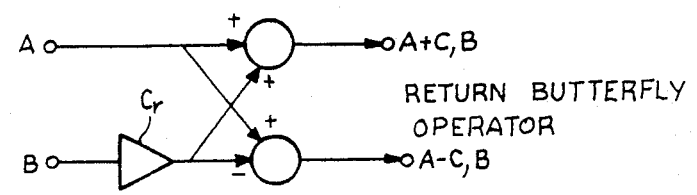
RETURN BUTTERFLY OPERATOR FIG_3
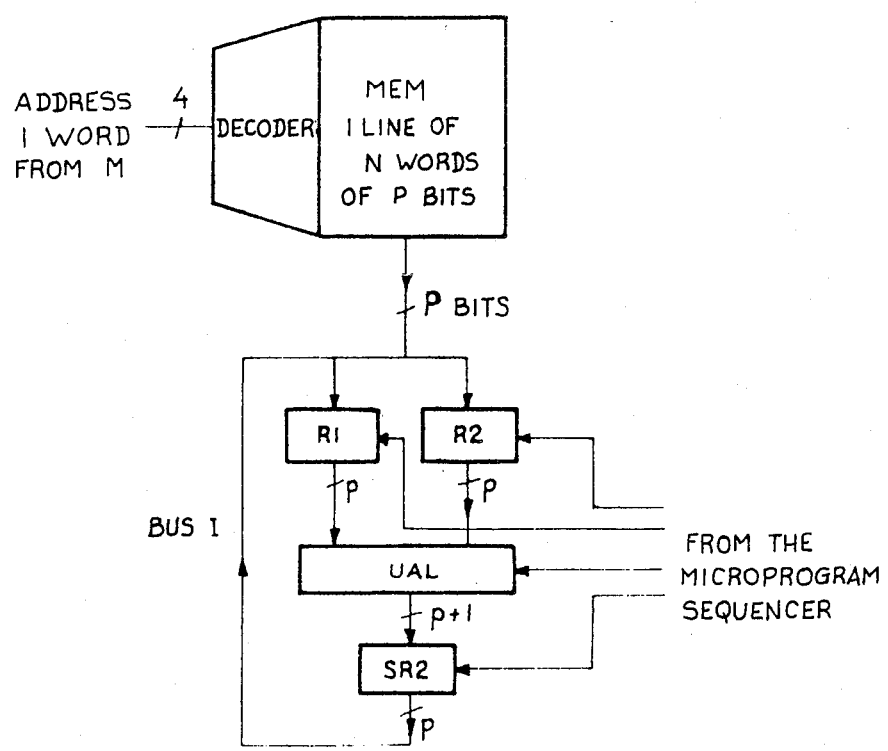

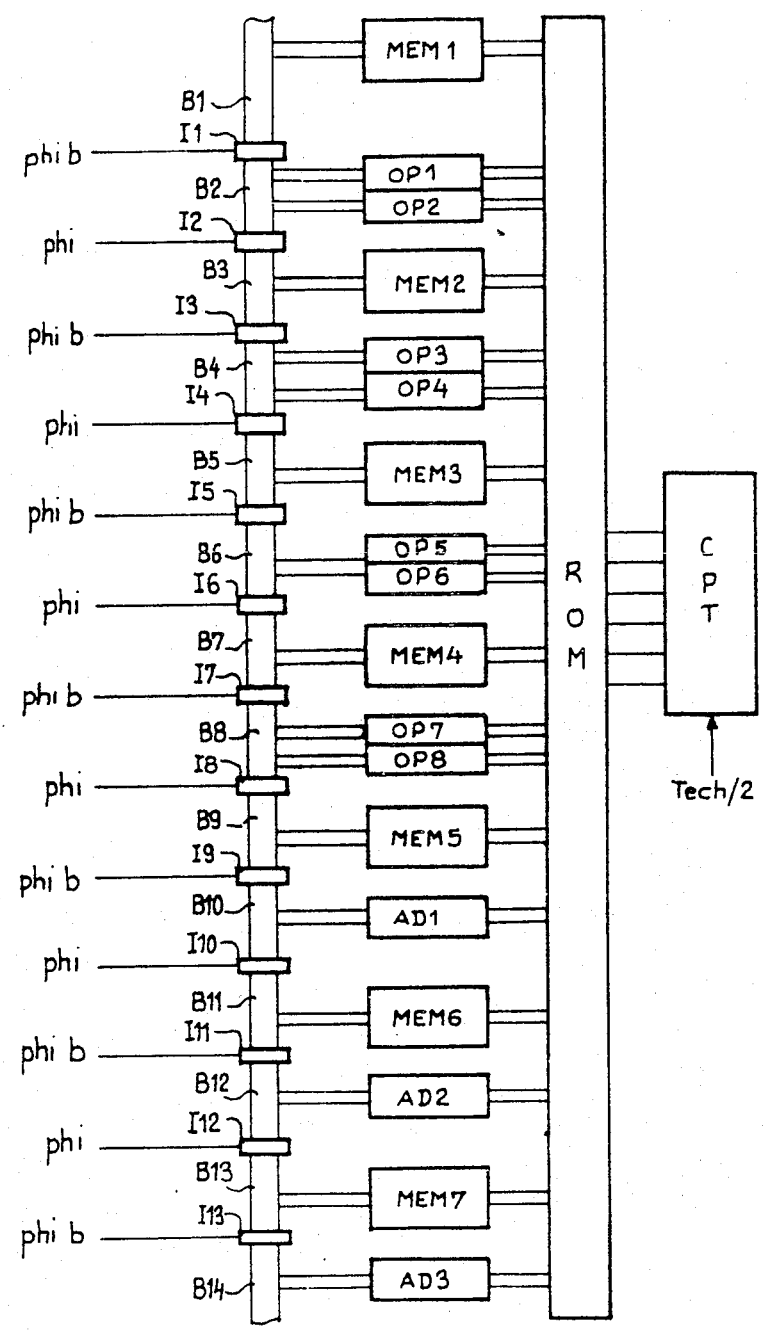
FIG_4

FIG_5
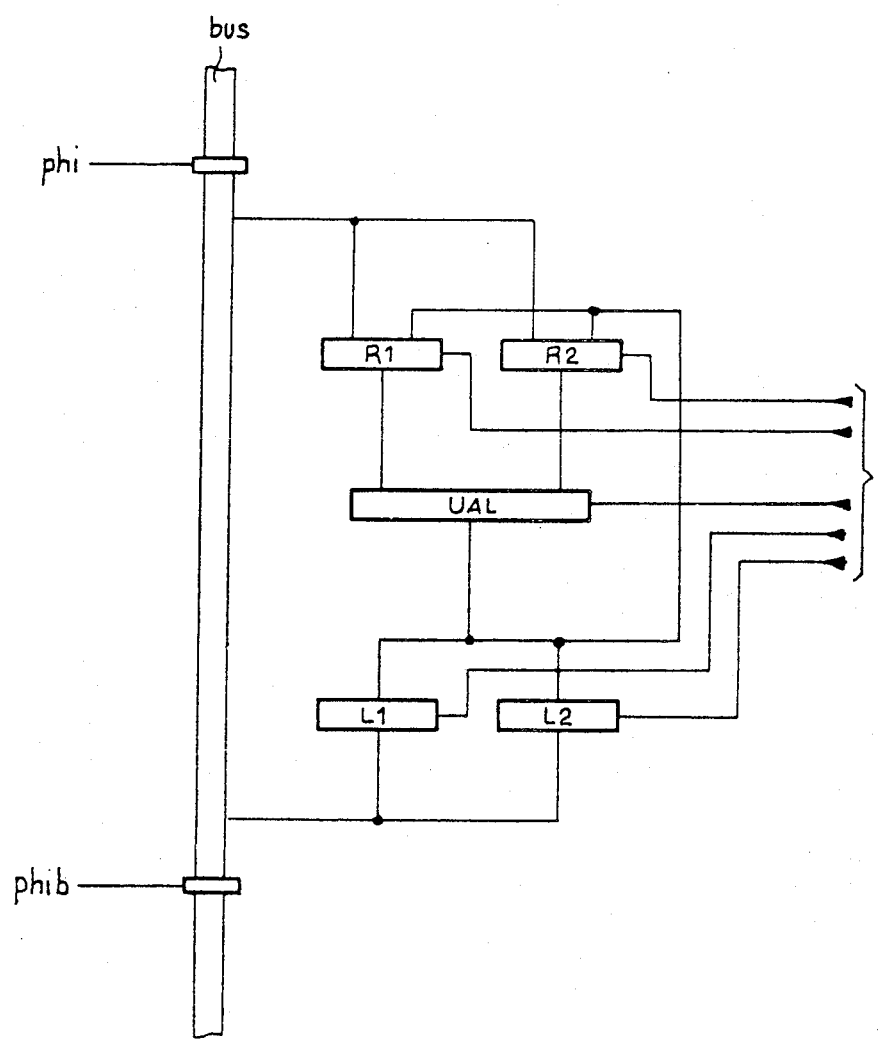

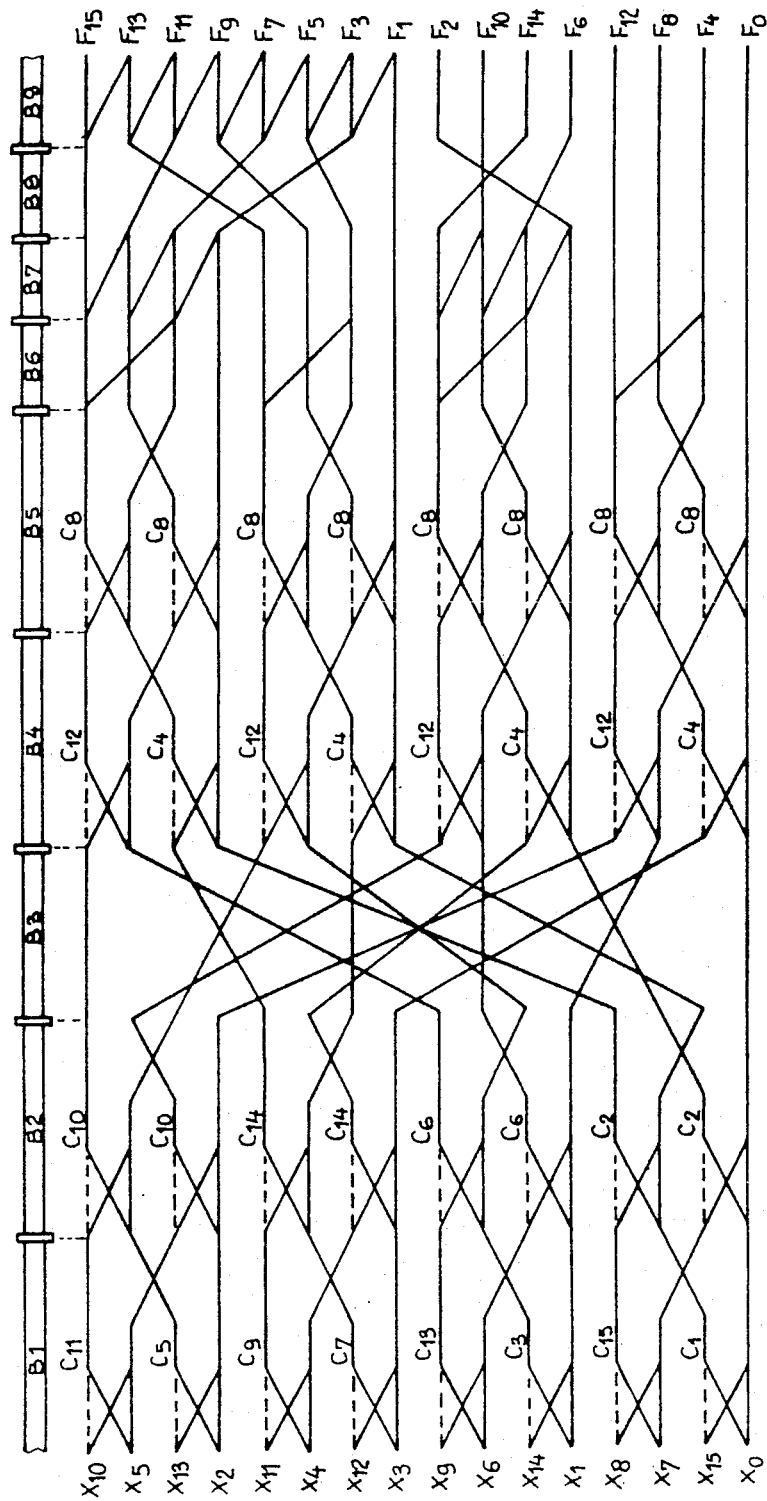
FIG_6

FIG_7
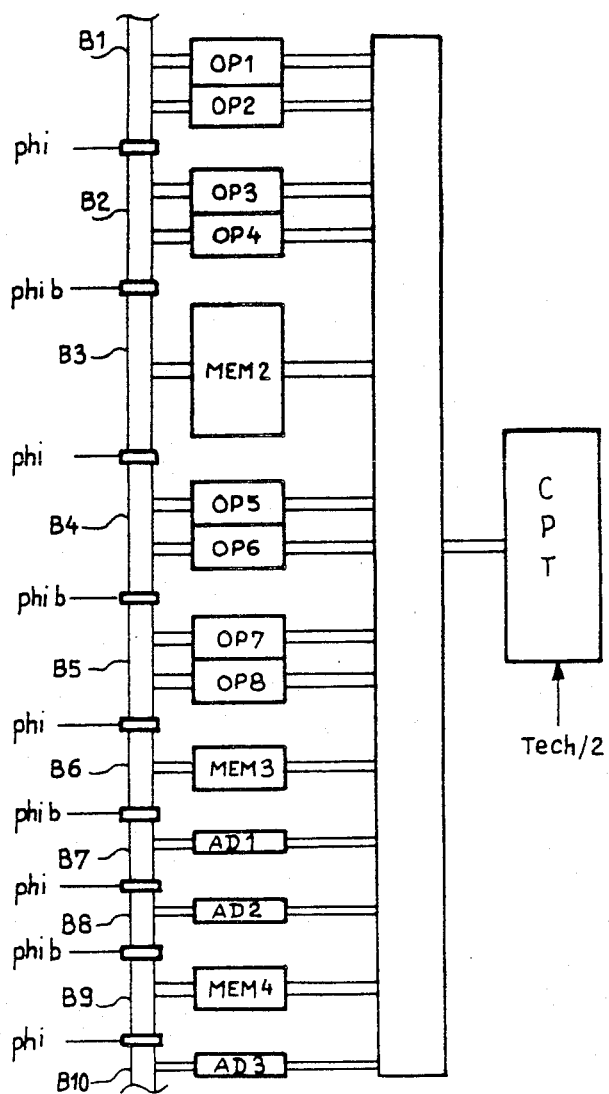

# INTEGRATED DIGITAL SIGNAL PROCESSING CIRCUIT FOR PERFORMING COSINE TRANSFORMATION

BACKGROUND OF THE INVENTION

The present invention relates to the digital processing of signals and relates more particularly to a circuit able to receive signals representing n digital values $x_j$ so as to produce signals representing n digital coefficients $F_v$ of the form $$F_v = \sum_{j=0}^{n-1} x_j f(j,v)$$

This category includes in particular the transformations called "monodimensional cosine transformations" where $f(j,v)$ is of the form $$\cos(2j+1) v/n$$

These transformations are used in particular for processing images for preparing transmission thereof in digital form.

In this case, from a block of $n \times n$ digital values, $n \times n$ coefficients $F_v$ are produced.

To produce these transformations, algorithms are used for example Byeong Gi Lee's algorithm for the monodimensional cosine transform.

Byeong Gi Lee's algorithm is described in the article "FCT - a Fast Cosine Transform", published in the proceedings IEEE ICASSP of 1984.

These algorithms are in the form of graphs indicating the successive operations to be carried out on the data or groups of data which are assumed to arrive in parallel.

Byeong Gi Lee's algorithm is represented by the graph of FIG. 1. The input data to be processed are the digital values $X_0$ to $X_{15}$ (16 values), each coded for example over 16 bits. The output values are the coefficients F0 to F15. The input data are processed in pairs in a first series of operators which each provide two results; the results are again processed in pairs in a second series of operators which in their turn each supply two results, and so on.

In this graph, two sorts of operators are met with, redrawn schematically in FIG. 2; an addition operator causes the values A+B and B to correspond to two values A and B and a so called "butterfly" operator causes the values A+B and C*(A−B) to correspond to two values A and B, where C is a multiplicator coefficient.

To better identify these Operators in FIG. 1, an addition operator has been surrounded with a rectangle and a butterfly operator with another rectangle. The graph of FIG. 1 includes 32 butterfly operators and 17 addition operators.

FIG. 2 also shows two other operators used when it is desired to carry out the inverse transformation of the original transformation, that is to say when it is desired to find again values $x_j$ from coefficients $F_v$. The operators are respectively a "return" addition operator supplying A+B and A from A and B and a "return" butterfly operator supplying A+$c_r$B and A−$c_r$B from A and B.

The architectures of the circuits for carrying out transformations of the cosine type are designed for processing the data in real time, that is to say sufficiently rapidly for the results of the calculation to be supplied with a flow equal to the data flow entering the circuit.

An architecture already proposed consists in forming microprogrammed operators in parallel for simultaneously processing n series of n digital values $x_j$. Each operator is capable of carrying out very simple operations under the control of a microprogrammed sequencer and the sequence of operations carried out makes it possible to execute the whole of the algorithm over the n series, through an instruction microprogram; all the operators simultaneously receive the same instruction. Beyong Ge Lee's algorithm for processing 16 digital values of 16 bits each requires for example about 500 instructions (addition, transfer from one register to another, shift etc ... ). A block of lines of 16 values each is processed by 16 operators each assigned to a line of 16 values.

Consequently, in this type of architecture, n non specialized operators are used capable not only of carrying out several types of operations (addition or butterfly, outgoing or return), but also of carrying out these operations over several data appearing successively at the inputs of these operators.

Thus, in the graph of FIG. 1, an operator will execute the butterfly operation over two data $x_0$ and $x_{15}$ then over two other data $x_1$ and $x_{14}$ etc, then when it has finished a series of eight operations, it will begin again on the sixteen results of these operations, that is to say first of all on two data which are on the one hand the result obtained from $x_0$ and $x_{15}$ and on the other hand the result obtained from $x_7$ and $x_{13}$ etc.

FIG. 3 shows how the architecture of such a circuit appears, with a working memory of 16 words and an operator performing successive operations (32 multiplications and 81 additions) on the words of the memory, the operator being controlled by an instruction program delivered by a microprogrammed sequencer (about 500 instructions for executing the transformation over 16 points).

In such an architecture it is necessary to cascade two circuits so as to perform the bidimensional cosine transformation.

In another circuit architecture, the lines of 16 digital values are introduced sequentially, one after the other and, once they are stored, an operator matrix receives the sixteen digital values in parallel. The operators are those shown in FIG. 2, and they are connected together as in the graph of FIG. 1. This is a systolic type architecture where the topology of the circuit is very close to that of the graph. The operators are necessarily "series" operators that is to say working sequentially first of all on the least significant bits of the numbers to be processed, then on the bits of immediately higher significance etc. The 16 digital values are therefore each introduced in the form of sixteen bits entering the operator matrix in series. Each operator processes two well defined data; for example one operator is assigned solely to the execution of a butterfly operation on the data $x_0$ and $x_{15}$, and there will necessarily be other operators for processing the other data and the results of the processing of this data. This is an essential difference with the above described architecture. This systolic type architecture has the advantage of being rapid and compact. But the accuracy of the computations is necessarily limited, the processing of the blocks of a size less than the size normally provided is difficult, and the flexibility and versatility of the circuit are low.

To construct an integrated circuit having very good performances in so far as the speed, the compactness, the versatility and the aptitude to carry out not only the transformation of values $x_j$ into coefficients $F_v$ but also the reverse transformation making it possible to find again the values $x_j$ from the coefficients $F_v$, the present invention proposes an architecture different from the known architectures.

SUMMARY OF THE INVENTION

This architecture includes:

a signal transmission bus capable of transmitting a signal of p bits representing a digital value, switches spaced apart along the bus for letting the signals pass along the bus or interrupting these signals, two adjacent switches along the bus being actuated in phase opposition, so as to divide the bus into sections, each bus section communicating alternately with a preceding section and a following section, computing operators are connected to certain sections of the bus and may receive successive data of p bits therefrom, for carrying out a computation on this data and sending resulting data over this bus section, buffer memories are connected to other bus sections so as to receive several successive data therefrom and send them over a bus in an order different from the order in which they were received, each computation operator or buffer memory is controlled by a microprogrammed sequencer.

With this type of architecture, each stage connected to a bus section may communicate over the bus solely with one of its two neighbors (the upstream neighbour for receiving data therefrom, the downstream neighbour for delivering data thereto, thereby providing a unidirectional flow of data).

This structure may be travelled through in both directions so as to perform an inverse transformation for finding again the digital values $x_j$ from coefficients $F_v$; only the microprogrammed sequencers influence the direction of the communication.

The structure is very versatile in that it makes it possible to adapt to different transformation algorithms without many circuit modifications; also, for a same algorithm such as that of Byeong Gi Lee, capable of processing blocks of $16 \times 16$ digital values, by slightly modifying the microprograms stored in an ROM (or by masking certain data in this memory), the input data may be processed by blocks of $8 \times 8$ or $4 \times 4$. This is not possible with a systolic architecture.

Finally, this architecture requires less space than an architecture in which a block of $n \times n$ data is processed by n parallel stages each processing simultaneously n data.

BRIEF DESCRIPTION OF THE DRAWINGS

Other features and advantages of the invention will be clear from reading the following detailed description with reference to the accompanying drawings in which:

FIG. 1 shows the graph of Byeong Gi Lee's algorithm;

FIG. 2 shows symbolically two elementary outgoing operators and two elementary return operators used in Byeong Gi Lee's algorithm, FIG. 3 shows a circuit architecture proposed in the prior art;

FIG. 4 shows the architecture of the invention;

FIG. 5 shows an elementary operator controlled by microprogram;

FIG. 6 shows the graph of Byeong Gi Lee's algorithm reorganized for correct adaptation to the circuit architecture of the invention; and FIG. 7 shows the architecture of the circuit formed from this reorganized graph.

DESCRIPTION OF THE PREFERRED EMBODIMENT

The architecture of the circuit of the present invention is shown in FIG. 4.

It includes essentially a data transmission bus, divided into sections separated from each other by switches which prevent or allow the passage of data from one section to the other. The switches surrounding a given section are actuated in phase opposition so that one section may communicate with one or other of its two neighbors, but not with both at the same time.

The switches are designated by I1, I2 etc. in the order of their succession along the bus.

The closure phases for the switches are designated by phi and phib respectively, phib being the logic complement of phi.

To each section are connected either one or more computation operators, or a buffer memory.

The computation operators receive data arriving over a bus section to which they are connected and they deliver a result over this same section.

The buffer memories record data arriving over the section to which they are connected and they send back this data over the same section, but in a different order from that in which it arrived.

The computation operators like the buffer memories are each controlled by a respective microprogrammed sequencer, the whole of the sequencer being controlled by an overall counter whose counting cycle lasts n periods Tech for a computation over n data.

The switching period for the switches separating the sections is the period Tech at which the data to be processed appears at the input of the circuit, for example 74 nanoseconds. The results of the computation leave at the same rate.

With this architecture applied to the graph of FIG. 1, it may be provided for the first section B1 to be assigned to a first memory MEM1 whose role is to receive the data $x_j$ to be processed in the order in which it arrives, this during the phases phi, then restoring it during the phases phib, but in a different order and more particularly in an order which lends itself well to the first computing operation which will be carried out on this data.

The second bus section b2 is connected to one or possibly more computing operators which receive data to be processed from memory MEMI during the periods phib. For example, a "butterfly" operator OP1 and a butterfly operator OP2 may be provided which work practically in parallel (so as to go faster). The operator OP1 takes for example the data $x_0$ and $x_{15}$ and calculates the result whilst the operator OP2 takes the data $x_1$ and $x_{14}$, then operator OP1 takes $x_3$ and $x_{12}$ while OP2 carries out its computation, etc.

The third bus section B3 is connected to a buffer memory MEM2 whose role is to receive, during the phases phi, the results of the computations carried out by the operators OP1 and OP2, then to restore this data during the phases phib but in an order more appropriate to processing by the operators of the following sections.

The fourth bus section includes for example two other operators OP3 and OP4 assigned to a second series of butterfly operations, that is to say, referring to the graph of FIG. 1, to the series of butterfly operations which are to be carried out on the results of the butterfly operations of the first series.

For example, $x_0$ and $x_{15}$ had given a first and second results; $x_7$ and $x_8$ a third and fourth results; in the operators OP3 and OP4, the first result and the third will undergo a butterfly operation and similarly the second and the fourth will also undergo an operation.

Thus, successive bus sections will be established with operators which correspond narrowly to the columns of the graph of FIG. 1, the sections connected to these operators being able to be separated, although it is not always necessary, by sections connected to memories serving for reorganizing the order in which the data produced by an operator must appear at the input of the next operator.

In the graph of FIG. 1, four consecutive columns of butterfly operations can be counted to which four bus sections B2, B4, B6, B8 may be assigned, these sections being separated by sections B1, B3, B5, B7 assigned to four reorganization memories MEM1, MEM2, MEM3, MEM4. Then three columns of addition operations can be seen to which three bus sections B10, B12, B14 may be assigned separated by sections B9, B11, B13 assigned to three reorganization memories MEM5, MEM6, MEM7. The addition operators are designated by the letters AD and the butterfly operators by the letters OP.

In FIG. 4 an ROM has been shown which contains the instructions for controlling the operators and the buffer memories, as well as the coefficient Cr used in the different butterfly operations.

This ROM contains then in particular the successive addresses of the memories MEM1 to MEM7 in which a datum is to be recorded or from which a datum is to be read, since theoretically these addresses will not be consecutive (or in any case will not be consecutive both for writing and for reading).

The ROM receives as addresses the outputs of a general counter CP2 whose counting cycle corresponds to the time required for computing the whole of a transformation of n data. For example, the counting period is Tech /2 and the cycle is 256×Tech.

Each operator may be similar to the one which is shown in FIG. 5: it would include a simple arithmetic and logic unit UAL capable of carrying out elementary operations of addition, subtraction, or left right shift of one or two bits; it would also include registers R1, R2, L1, L2 for carrying out these elementary operations; and it would receive from the ROM control bits specifying at all times the operations to be carried out.

By changing the instructions contained in the ROM, the computing algorithm can be changed; by masking certain instructions, the algorithm may be modified for processing for example groups of 8 data instead of 16.

Finally, the circuit is reversible in that, still through a modification of the instruction programs in the ROM, it makes it possible to apply data to the output of the bus so as to carry out a reverse transformation of the original transformation. It should in fact be understood that the reverse transformation takes place, particularly for Beyong Ge Lee's algorithm, by passing from left to right in the graph of FIG. 1.

In this case, the instruction microprograms contained in the ROM are such that an operator of a bus section takes data, for processing it, coming from the following section and not from the preceding section. The phases phi and phib are permuted.

To end this description, it must be stated that it may be advantageous to reorganize the graph describing the computation algorithm before defining the precise architecture, that is to say the different bus sections and the operators and buffer memories which are attached thereto.

Thus, a new presentation of the Byeong Gi Lee graph is proposed here, shown in FIG. 6, which presentation has the advantage of minimizing the number of bus sections required.

In the graph shown in FIG. 6, the multiplier coefficients are indicated inside each block. The data must be presented to the input of the graph with the organization defined by the indices $x_j$ of the column at the extreme right of the graph.

As can be seen in this graph, a first bus section B1 is required for carrying out the butterfly operations of the first column of blocks; to this section will be connected for example two operators OP1 and OP2 working practically in parallel; another section B2 is required for carrying out the operations of the second column from the results supplied by OP1 and OP2; hereagain, two other operators OP2 and OP4 may work in parallel.

But it is not necessary to provide a data reorganization memory between these two groups of two operators, for the crossing of the computing paths of the graph are sufficiently simple for the reorganization to be made directly by the instruction microprogram which drives the operators OP3 and OP4.

On the contrary, after processing by the operators OP3 and OP4, the reorganization is very important and consequently requires a third bus section B3 coupled to a buffer memory MEM2.

FIG. 7 shows the construction of the circuit which results therefrom.

A fourth section B4 is then provided with two operators OP5 and OP6, a fifth section B5 with two operators OP7 and OP8, a sixth section B6 with a reorganization memory MEM3 (this section and this memory are optional), a seventh section B7 with an adder AD1, an eighth section B8 with another adder A2 (hereagain a reorganization memory between sections B7 and B8 may be dispensed with); finally, a ninth section B9 is provided with a reorganization memory MEM4 and a tenth section with a last adder AD3.

Thus, particularly efficient integrated circuit architecture has been described, particularly for implementing Byeong Gi Lee's algorithm.

What is claimed is:

1. An integrated circuit for the digital processing of signals, performing a specific transformation of input signals representing a digital values $x_j$ so as to produce signals representing n coefficients $F_v$ of the form $$F_v = \sum_{j=0}^{n-1} x_j f(j,v)$$

wherein f(j,v) is a function of the indexes j and v, comprising:
- a signal transmission bus for unidirectionally transmitting a signal of p bits representing a digital value;
- switches spaced apart along the bus for letting the signals pass along the bus or for interrupting these signals, with any two adjacent switches along the bus being actuated in phase opposition, so as to divide the bus into sections, each bus section communicating alternately with a preceding section and a following section;

computing operators are connected to certain sections of the bus and may receive successive data of p bits therefrom, for carrying out a computation on this data and sending resulting data over this bus section;

buffer memories are connected to other bus sections so as to receive several successive data therefrom and send them over a bus in an order different from the order in which they were received;

microprogrammed sequences for controlling each of said computation operator or said buffer memory.

2. The circuit as claimed in claim 1, wherein the specific transformat is a cosine type transform wherein $f(j,v) = \cos[(2j+1)v\pi/n]$, said circuit further comprising:

at least seven successive bus sections separated by switches, with the first, the second, the fourth, the fifth of said bus sections being connected to the operators for carrying out operations of the butterfly type, the third of said bus section and the sixth of said bus section being connected to memories, and the seventh of said bus section being connected to an operator for carrying out an addition operation, the butterfly operation being an operation which causes two data $A+B$ and $C^*(A-B)$ to correspond to two data A and B.

* * * * *